United States Patent
Hauser

(10) Patent No.: US 9,688,031 B2
(45) Date of Patent: Jun. 27, 2017

(54) APPLIANCE FOR REPAIRS OF LOCAL DAMAGE OF LAMINATED GLASSES, PARTICULARLY GLASSES OF CARS AND OTHER TRANSPORTATION MEANS

(71) Applicant: Vladimir Hauser, Ceske Budejovice (CZ)

(72) Inventor: Vladimir Hauser, Ceske Budejovice (CZ)

(*) Notice: Subject to any disclaimer, the term of this patent is extended or adjusted under 35 U.S.C. 154(b) by 0 days.

(21) Appl. No.: 14/430,739

(22) PCT Filed: Sep. 25, 2013

(86) PCT No.: PCT/CZ2013/000115
§ 371 (c)(1),
(2) Date: Mar. 24, 2015

(87) PCT Pub. No.: WO2014/048405
PCT Pub. Date: Apr. 3, 2014

(65) Prior Publication Data
US 2015/0239185 A1    Aug. 27, 2015

(30) Foreign Application Priority Data

Sep. 26, 2012 (CZ) .............................. PV 2012-662
Jul. 2, 2013 (CZ) ........................ PUV 2013-28155

(51) Int. Cl.
| B29C 65/52 | (2006.01) |
| B32B 37/12 | (2006.01) |
| B32B 38/18 | (2006.01) |
| B32B 39/00 | (2006.01) |
| B29C 73/02 | (2006.01) |
| B32B 17/10 | (2006.01) |

(52) U.S. Cl.
CPC ...... *B29C 73/025* (2013.01); *B32B 17/10963* (2013.01); *B32B 2315/08* (2013.01)

(58) Field of Classification Search
USPC ................................... 156/94, 104, 105, 391
See application file for complete search history.

(56) References Cited

U.S. PATENT DOCUMENTS

| 3,841,932 | A | 10/1974 | Forler et al. |
| 4,032,272 | A | 6/1977 | Miller |
| 4,385,015 | A | 5/1983 | Klettke |
| 4,776,780 | A | 10/1988 | Banks |
| 4,820,148 | A | 4/1989 | Anderson |
| 6,485,281 | B1 | 11/2002 | Curl |
| 6,589,036 | B1 | 7/2003 | Rawlins et al. |

FOREIGN PATENT DOCUMENTS

| GB | 2469527 A | 10/2010 |
| WO | 97/39879 A1 | 10/1997 |

*Primary Examiner* — Sing P Chan
(74) *Attorney, Agent, or Firm* — Jacobson Holman, PLLC.

(57) ABSTRACT

The invention relates to an appliance for repairs of local damage of laminated glasses consisting of a body with a base fitted with circumferential elastomer gasket for underpressure suction to the glass. The substance of the invention is that a closing member of an overflow valve for underpressure supply to a repair compartment is arranged so that when closing, it moves in the underpressure suction direction and pushed to a seat by generated pressure. The repair compartment is connected directly with the underpressure source via the overflow valve. A fixing compartment is connected, with the underpressure source independently. To interconnect underpressure/pressure, a lid with boreholes is used as well as a flat gasket with holes and a shape groove.

27 Claims, 13 Drawing Sheets

D-D
5:1

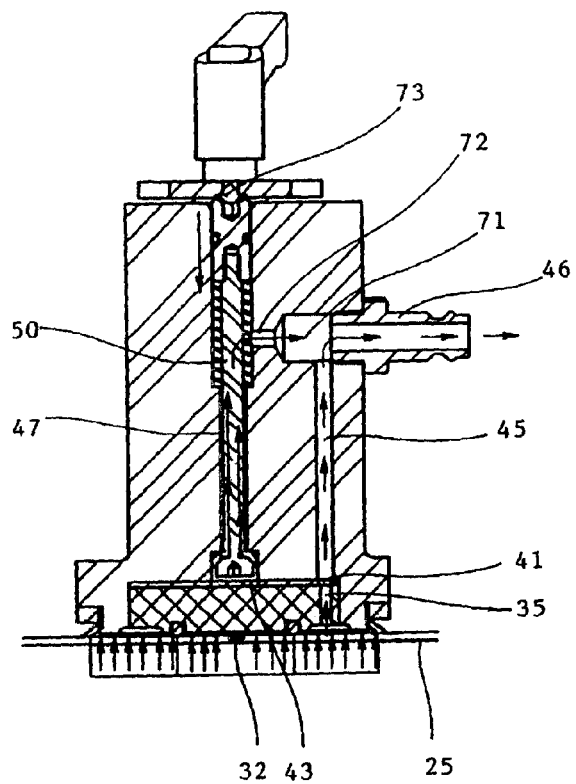
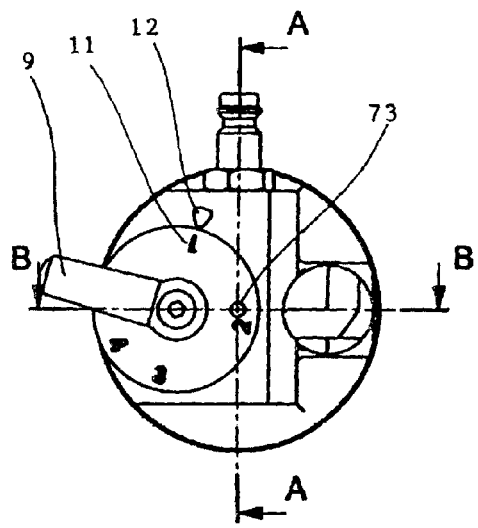
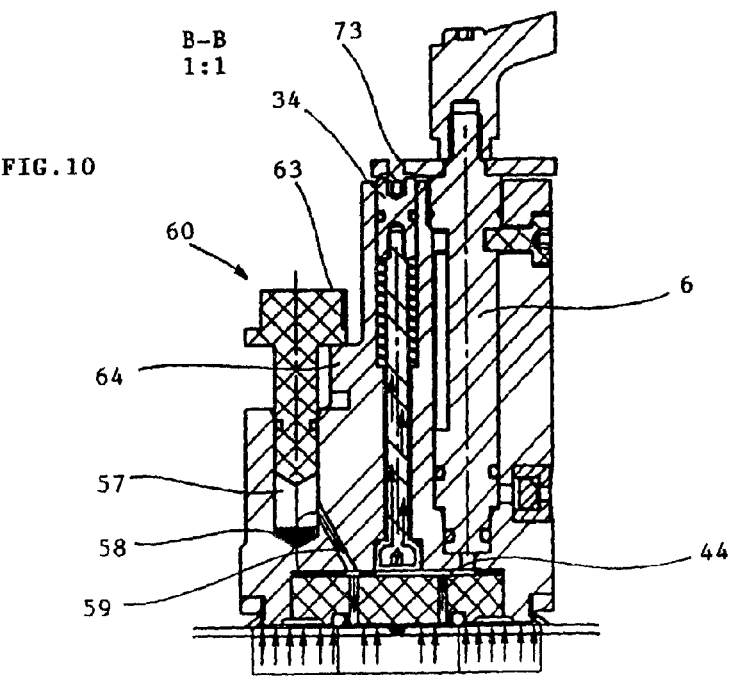

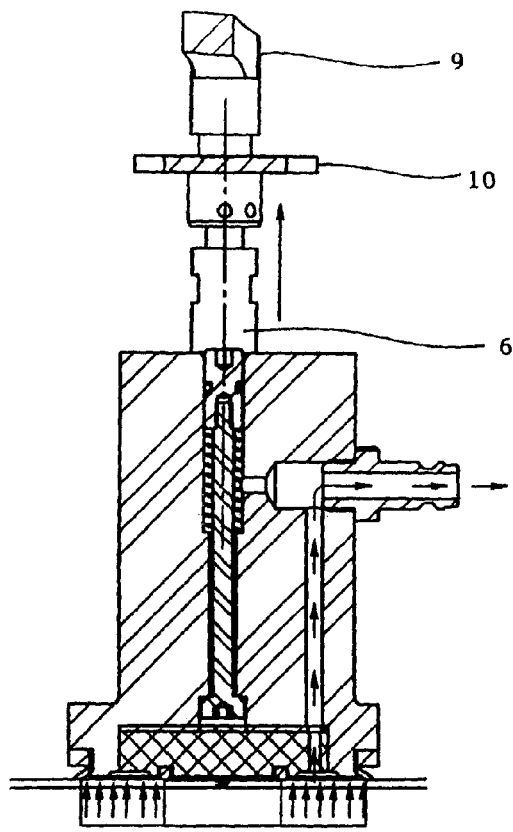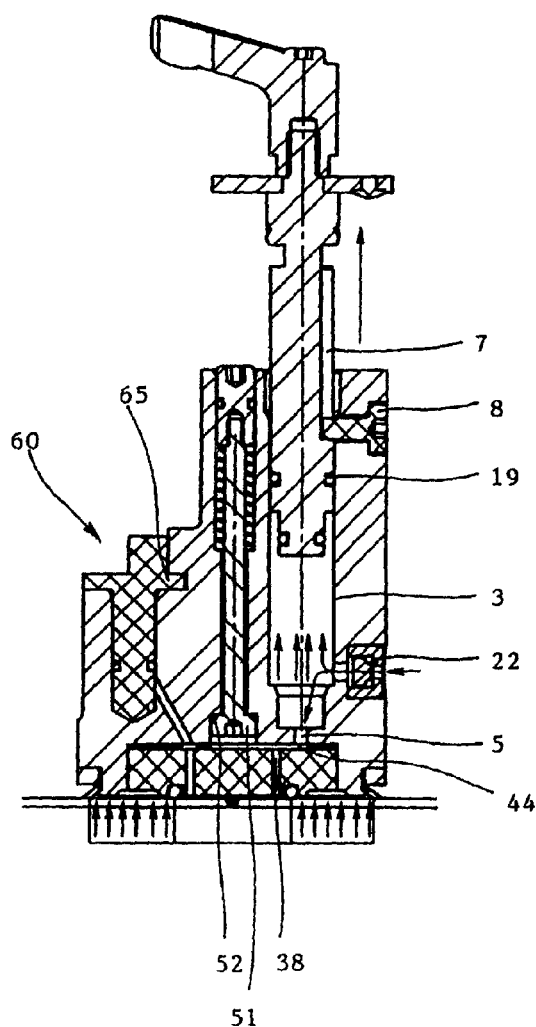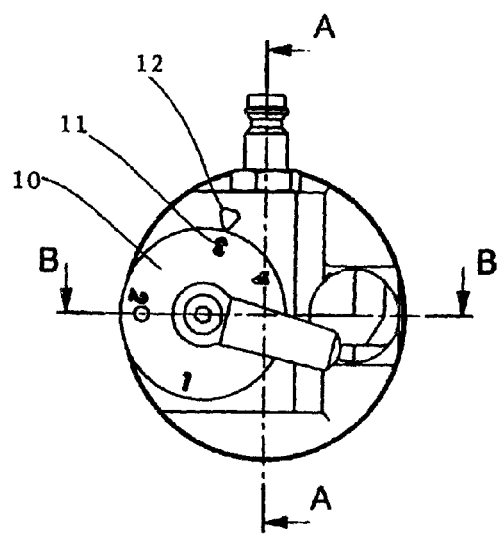

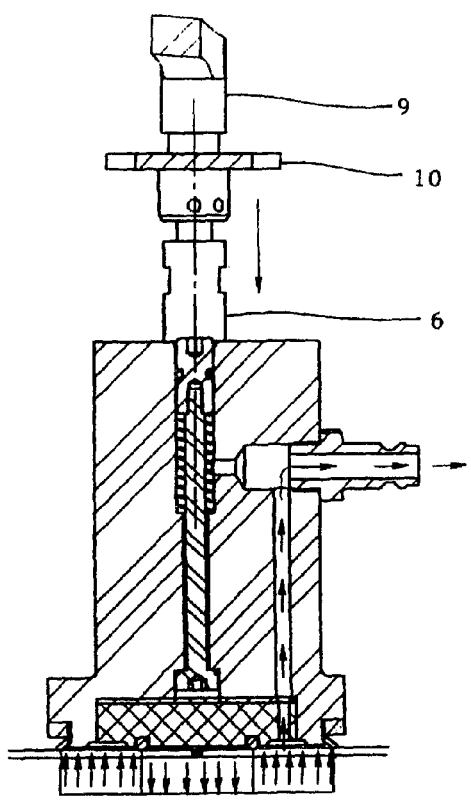
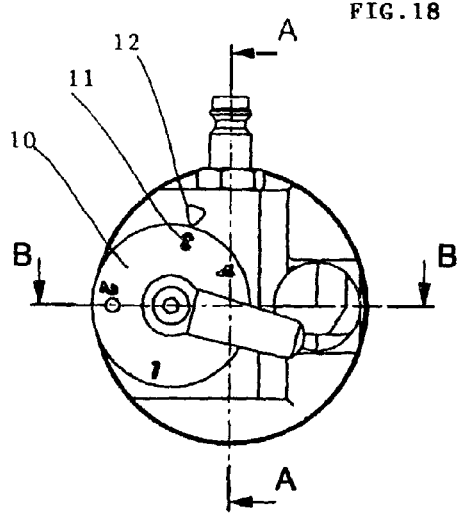
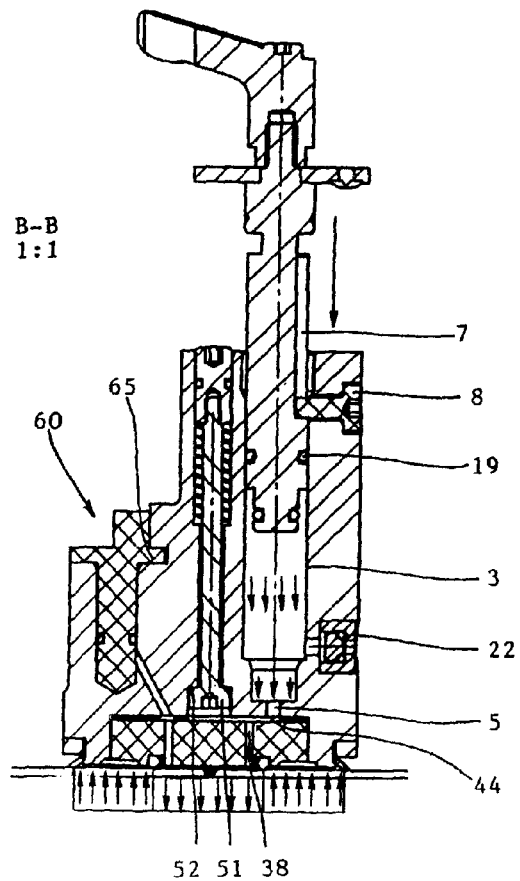
FIG. 17
FIG. 18
FIG. 19

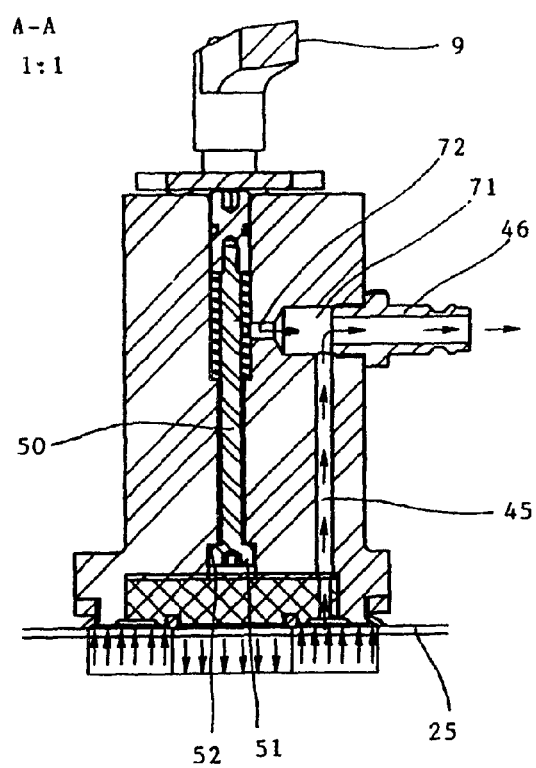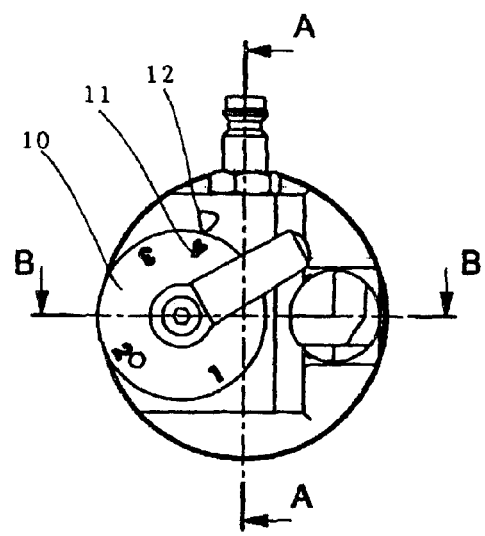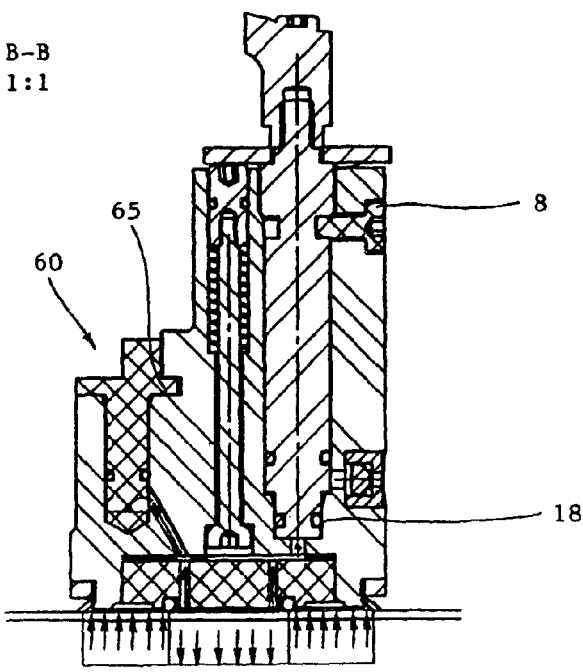

APPLIANCE FOR REPAIRS OF LOCAL DAMAGE OF LAMINATED GLASSES, PARTICULARLY GLASSES OF CARS AND OTHER TRANSPORTATION MEANS

FIELD OF THE INVENTION

The invention relates to the appliance for repairs of local damage of laminated glasses of sandwich structure, consisting of two glass layers with intermediate layer made of plastic foil (hereinafter "glass"), particularly glasses of cars and other transportation means, generally using a glue applied in the point of damage. Term "damage" as used herein could particularly include local chipping of glass surface, caused most often by chipping off stones and other defects developing in the point of chip damage. Term "glue" as used herein could include resin or other repair materials, liquid or viscous and suitable for repair of glass damage.

BACKGROUND OF THE INVENTION

Damage of glasses on the transportation means, particularly front glasses of cars, usually occurs due to hitting of a small stone or similar small and hard thing to glass surface. In the point of collision, a part of the glass surface is chipped off and the damage may be of different depth and width. Very often, the damage shape is conical in which other radial cracks originate. Replacement of the glass is expensive and therefore, a wide range of methods and appliances for repairs of damaged windscreens of cars in situ without necessity of replacing of the windscreen glass.

The patent document U.S. Pat. No. 3,841,932 describes the method and appliance for repair of local conical damage where the glass is heated in the point of damage by a lamp and semi-circular plastic container is stuck to the point of damage with repair liquid, particularly polymerizable glue or resin. After running of the liquid to the point of damage, the chipped off glass is filled in and the repair point is then hardened. A disadvantage of this method and appliance is that the repair liquid does not run reliably to full crack area including potential radial cracks.

Another patent document U.S. Pat. No. 4,385,015 describes an appliance for repair of resisting glasses such as windscreens of cars. The appliance consists of two parts: a shell under which underpressure is generated and a cylinder fixed in the centre of the shell above glass damage. There is a hole in the cylinder side to expand underpressure to the point of repair and there is a piston above the compartment. Prior to introduction of underpressure, repair liquid is poured to the damage point. Underpressure acts to remove air bubbles from the repair liquid and the piston is then pressed. By pushing the piston on the liquid only after hole in the cylinder wall, the liquid is forced to fill in the compartment in the crack where it would not run spontaneously. Disadvantage of the invention is that by introducing of underpressure after application of the repair liquid, moisture is not removed from the point of damage and releasing gas produces new bubbles in the liquid.

Possibility for fixing to glass using underpressure throughout the period time has been mentioned in the patent document U.S. Pat. No. 4,776,780. This is an appliance with a diaphragm in its lower pedestal and the diaphragm is specially shaped so that it creates several separated spaces. Underpressure is achieved to fix the appliance to the glass in created in the peripheral inner compartment along the diaphragm circumference. This attachment to the glass is then fixed by an element to capture underpressure in the compartment. Another compartment is created under the diaphragm above the point of repair. Underpressure does not act in this compartment but the one is connected to the piston under which glue is poured and pushed into the glass break point. A disadvantage is that the glass break point is not free of all air, resisting to the glue and therefore, the glue runs to the glass break point with difficulties.

Improved solution of previous methods and appliances for repair of glass damage is the subject of the patented document U.S. Pat. No. 6,589,036. The patent describes an appliance consisting of a plastic body to which sealing collar on external circumference of a lid is attached using a matrix. The plastic body has a borehole for piston and borehole for installation of closed capsule with repair liquid (glue). The lid is fitted with a seal that divides the compartment under the sealing collar into the repair compartment above the break point and fixing compartment. The device is attached above the break point and fixed to the glass by partial underpressure from air pump in the fixing compartment around the repair compartment that is has shape of sealed circle ring. This partial underpressure is then released by disc valve to the separated repair compartment as well. The disc valve is then closed and increased underpressure by ejecting the piston is created in the repair compartment. After unlocking, the glue capsules are broken and the glue flows to the break point due to increased underpressure. Then, the underpressure is balanced and using the piston, pressure is developed on the glue in the repair point to allow running of the glue to all cracks and corners of the break point. A disadvantage of this solution is that partial even increased underpressure and pressure developed over the glue acts on the disc valve in the opening direction and thereby, glue leaks through the disc valve and pressure drops around the repair point. The glue is to a certain extent evacuated inside the appliance and air bubbles are present in the glue. The appliance gets dirty, must be cleaned and the repaired point shows optically undesirable defects in the form of microscopic bubbles. It is also disadvantageous when the glue is dosed by capsules of which volume is not always corresponding to the extent of glass damage. Design of the appliance is complex and its disadvantages are based mainly on the fact it contains the first means for normal pressure as well as second means for increased underpressure and during pressure changes, the glue and pressure leaks occur.

The patent document U.S. Pat. No. 6,485,281 describes an appliance for glass repair, consisting of a piston with a nozzle, from which the glue is pressed into the crack and at the same time, the nozzle is placed in an adapter that produces underpressure around the nozzle orifice. This ensures that no air blocks the glue flow during repair. A disadvantage of this solution is that during repair the glue is partially removed by pressure, makes tubes to the vacuum pump clogged and glue consumption increases.

The British patent document GB 2 469 527 presents an appliance mounted on a holder fixed on glass. The appliance consists of a piston with glue bin attached through the wall. The piston is lifted up and underpressure is generated. The glue is left flowing to the point of destination and then, the piston produces pressure to push the glue to the break point. A disadvantage of this solution is that the pressure generated is limited by the piston volume. When the piston is lifted up again, the glue would be removed from the break point.

The purpose of this invention is to produce an appliance, which would eliminate the drawbacks of existing solutions, particularly according to U.S. Pat. No. 6,589,036 patent. Design of the appliance must be to avoid flowing of glue inside the appliance and reducing underpressure/pressure during repair. Another purpose of the invention is simplified handling of the appliance, particularly as far as the glue application is concerned. In addition, the appliance should be universally applicable for different glue types, i.e. not limited to certain shape or size of capsules or glue types available on the market in these capsules only.

SUMMARY OF THE INVENTION

The goal specified is resolved by designing a device according to present invention.

The appliance for repair of local glass damage, particularly windscreens of cars and other transportation means, consists of a known body with a base fitted with circumferential elastomer seal that specifies the fixing compartment and which can be fixed on glass using underpressure from air pump brought to the fixing compartment. In the base area, there is a seal for the repair compartment that separates the repair compartment located above the glass damage point from the fixing compartment. The repair compartment is connected with a channel inside the glue supply body to the repair compartment. In addition, the appliance includes a general valve device for underpressure supply to the repair compartment and swivelling adjustable piston located in the cylinder borehole in the body to control individual work positions of the appliance and production of pressure in the repair compartment.

The substance of the invention is that the body base has a recess in which a lid with sealing of the repair compartment is placed in a removable way and the lid has a borehole for underpressure supply to the repair compartment. The valve device consists of overflow valve installed in the body and terminated to the recess. The overflow valve is fitted with a control arranged inside the body and connects the lid borehole with a connector for air pump connection. Said connection is guided outside the borehole compartment of swivelling adjustable piston. Another feature of the invention, which is important for keeping of constant pressure/underpressure, is a closing member of the overflow valve arranged so that it moves in the underpressure suction direction from the repair compartment to the terminal for the air pump connection when closing the overflow valve. The fixing compartment is linked to the terminal for the air pump connection using the borehole created separately in the lid and connects the fixing compartment with the channel for underpressure channel to the fixing compartment, guided in the body outside the overflow valve to the air pump connector and in addition, the appliance contains a device for air supply to the borehole compartment under the piston. The main benefit of the appliance according to present invention is that the underpressure compartment for fixing of the appliance is separated from the underpressure compartment for the damage repair and that the underpressure does not reduce during repair due to overflow valve leak. This is pushed in closing direction and keeps constant underpressure value. Placing of the removable lid in the recess and independent underpressure connection between the repair compartment and fixing compartment through said lid allows demountable design of the appliance, i.e. including assembly and disassembly of the overflow valve. The air supply device to the borehole compartment under the piston allows removal of underpressure acting in the repair compartment in certain phase of the repair process, which would remove the glue from glass damage cracks, whereas the underpressure in the fixing compartment remains retained.

In one favourable embodiment of the appliance according to this invention, said borehole for underpressure supply is further connected with the channel for pressure supply to the repair compartment, created in the body between the recess front and cylindrical borehole for swivelling adjustable piston. The solution of single borehole used both for underpressure supply as well as for pressure supply to the repair compartment is beneficial both in saving of space because the repair compartment is usually very small. Another benefit is that underpressure may not be present at the same time when pressure operates in the same borehole, i.e. the glue may not be removed from the repair compartment.

Another favourable embodiment of the appliance according to the invention, there is a flat gasket with a hole in the recess between the lid and the base front to supply underpressure to the repair compartment, arranged under termination of the overflow valve into the recess and fitted with shape groove running over the borehole orifice for underpressure/pressure supply in the lid and under the channel orifice for the pressure supply in the recess front. The flat gasket seals the space between the lid, recess and the overflow valve and underpressure from the overflow valve to the repair compartment is supplied through it. Through shape groove in the flat gasket, pressure from swivelling adjustable piston is supplied to the repair compartment.

As far as design of the flat gasket is concerned, its favourable embodiment is when the flat gasket has a hole for underpressure supply to the fixing compartment that connects the borehole in the lid with the channel for underpressure supply to the fixing compartment.

It is also favourable that the lid has borehole for glue supply to the repair compartment and the flat gasket has hole for glue supply that connects the borehole with the channel in the body. All distribution channels, boreholes and holes used for underpressure, pressure and glue supply are technologically concentrated into the lid area and sealed with a single flat gasket, which is favourable both with respect to reducing the number of components and improving reliability, reduction of production price and achieving of minimum service.

With respect to the lid design, the favourable embodiment is when the borehole for glue supply in the lid and the borehole for underpressure/pressure supply to the repair compartment in the lid are arranged in opposite areas of the lid outside the projection of the overflow valve, whereas the hole for underpressure supply in the flat gasket is arranged in the area of projection of the overflow valve. Said spatial arrangement uses the repair compartment best for removing of gas from the compartment and uniform flowing of the glue to the compartment without sucking the glue to a larger extent by present underpressure to the borehole for underpressure/pressure supply.

Another favourable embodiment of the appliance according to this invention, the cylindrical borehole for swivelling adjustable piston is connected in the lower part with a device for air supply to the borehole space under the piston, as a one-way suction valve installed in the body for air suction under the piston front. This embodiment allows suction of sufficient air volume under the piston when lifting the piston in order to get required air pressure when pressing on the piston to the repair compartment, acting on flowing of the glue to the break point. Suction and compressing of air can be repeated by multiple lifting and pressing of the piston until value required is reached. In order to keep the pressure constant and to avoid pressure drop, the cylindrical borehole is fitted in its lower section with a seat into which the seat on the piston front matches, whereas the piston is fitted with a piston sealing ring in the area above the seat and the piston front seat sealing ring in the seating area and between the sealing rings there is termination of the supply channel for air supply from one-way suction valve.

It is also favourable when the channel for pressure supply to the repair compartment is terminated on the bottom of the cylindrical borehole seat and is performed in the piston axis, which simplifies production and optimizes pressure conditions.

Another favourable embodiment of the appliance according to this invention is that the recess front has a notch forming the seat of the overflow valve in which a closing element of the overflow valve is arranged in a moving way. Stem of the overflow valve connected with the closing member has moving connection in the borehole for the overflow valve created in the body. End of the stem is connected with the control of the overflow valve that is arranged outside the body and connected with the component for external control.

Detailed construction of the overflow valve is favourably designed so that in the end of the stem, there is the pushing closure with a gasket, installed in a demountable way and located on the spring in the expanded upper section of the borehole for the overflow valve. The expanded upper part of the borehole is connected using the connection channel with the air pump connector and the pushing closure is arranged for connection with the control of the overflow valve; said embodiment is favourable because the pushing spring ensures common closing of the overflow valve, i.e. fitting of the closing member against the seat using pull generated on the stem. When the overflow valve is opened, the control pushes the pushing closure, the stem with closing member moves vertically downwards through the spring pressure, the overflow valve opens and gas from the repair compartment is removed.

It is favourable when the control of the overflow valve consists of a flange fitted on the swivelling adjustable piston outside the body so that opening and closing of the overflow valve can be controlled by rotating the swivelling adjustable piston including the flange that causes opening/closing of the overflow valve at certain angle.

The favourable construction embodiment of the flange forming the control of the overflow valve, where the flange is of round shape, its lower side fitting against the pushing closure is fitted with at least one pressing projection and the pushing closure is fitted with corresponding shape recess on its upper side for matching of the pressing projection. In this embodiment, the overflow valve is pressed, i.e. open in one position of the swivelling adjustable piston only, where the pressing projection of the flange matches with the shape recess of the pushing closure. The overflow valve is closed in all other operation positions of the swivelling adjustable piston.

In another embodiment of the appliance according to this invention it is favourable when the body base, recess, lid and flat gasket have round shape and are arranged coaxially each other. The overflow valve axis is identical to their central axis and the axis of the swivelling adjustable piston is parallel to the axis of overflow valve. The described embodiment is favourable with respect to easy production, body and lid machining as well as with respect to easy assembly, disassembly and failure-free operation.

In the favourable embodiment of the swivelling adjustable piston, said piston is fitted with an interlock groove to which a guiding pin fixed to the body and protruding to the cylindrical borehole fits. The interlock groove consists of round circumferential groove for swivelling positioning and of vertical guiding groove for vertical movement of the swivelling adjustable piston in the cylindrical borehole.

For simple and precise swivelling of the piston into individual work positions, it is favourable when the swivelling adjustable piston is fitted with a positioning head in the upper part, where the head is placed in the expanded part of the borehole and with arresting pits along its circumference. Angular position of the arresting pits corresponds to individual angular work positions of the swivelling adjustable piston, whereas the arresting pin protruding to the cylindrical borehole engages to the arrestment pits.

In favourable construction embodiment, the flange is fitted onto the piston outside the body above the positioning head and fitted with marks corresponding to individual work positions of the swivelling adjustable piston, whereas at least one indicator in opposite direction to the marks is shown on the body.

In another favourable embodiment of the appliance according to this invention, the body has a bin for loose liquid viscous glue, whereas the channel orifice for glue supply to the repair compartment protrudes to the bin above the level created by the glue volume required for repair of damage. The appliance of this embodiment allows working with any type of loose liquid glue or resin and not only with glue distributed in closed shaped capsules.

In order to transport the glue at right time from the bin to the repair compartment, the favourable embodiment of the appliance is designed so that the bin forms a lower part of the borehole in the body, whereas the upper part of the borehole has the valve stem for the glue supply with vertical, swivelling and shifting movement possible. The valve stem is connected with the valve head arranged outside the body with its possible arrestment in the upper and lower position. In addition, the stem is fitted with gasket and groove for overflowing of the glue from the bin to the channel when the valve is in the lower position.

The glue supply valve is used for squeezing the glue from the bin through the groove for overflowing of the glue to the channel in the body for glue supply up to the repair space as soon as the glue fits into the bin where it is moved by pressure created in the repair compartment.

In the favourable embodiment of the glue supply valve, the valve head is fitted with arresting stop block to fit against the arrestment body projection in the upper position and the arresting safety pin matching with the recess for the arresting safety pin in the lower position. The arresting stop block prevents to premature engagement of the valve into the borehole—it must be released manually and let the valve engage in the bin and squeeze the glue. On the contrary, the arresting safety pin is used to keep the valve blocked in the lower position when pressure is brought to the repair compartment. The glue supply valve may not be pushed away by pressure from the borehole and is sealed using the gasket, therefore no pressure drop occurs when pressurizing the repair compartment.

Finally, it is favourable when the external circumference of the lid and inner circumference of the base are fitted with opposite circumferential semi-grooves that jointly form a distribution channel for underpressure distribution in the fixing compartment, which improves the effect of fixing on glass.

In another favourable embodiment of the invention in which the suction valve was removed, the advantages of the invention lie in the fact that the seating diameter of the head of the swivelling adjustable piston and of the borehole in the area where the piston head is mounted is smaller than the diameter of the upper seating of the swivelling adjustable piston and of the borehole at the site of the upper seating, while at the same time the swivelling adjustable piston at the seating of the piston head is fitted with at least one seal for sealing it in the lowest working position in the borehole with a seating diameter of the piston head, while in the highest working position of the swivelling adjustable piston the seating of the piston head with seal is arranged with clearance in the borehole with the diameter of the upper seating, and also the swivelling adjustable piston is fitted with a control means for controlling the valve device arranged inside the body of the appliance. This results in the absence of a suction valve in the construction of the device and a reduction in the manufacturing cost of the device. The amount of trapped air in the lower area of the borehole is also smaller, so the developed pressure on the flowing glue is lower in comparison to the current design.

In another favourable embodiment of the invention, the interlock groove connection shape corresponds to the continuous individual working positions of the swivelling adjustable piston. The groove prevents any accidental or intentional rotation of the adjustable piston during the particular technological step of the repair process, so no locking means, which would make the production of the device more difficult, are necessary.

In another favourable embodiment, the control means for controlling the valve device consists of a positioning head formed on the swivelling adjustable piston at a point above the upper seating, the diameter of which is larger than the diameter of the upper seating, and which is provided with a piston handle. The adjustable head is an integral part of the piston and acts directly on the valve device directly, so that the device is structurally simpler and is more resistant to damage.

In another further favourable embodiment of the invention, the difference in diameter of the adjustable head and the diameter of the upper seating creates an overlap which is provided with a recess for controlling the valve device by compressing or releasing in the borehole. In the rotational position of the adjustable piston corresponding to the technological step of creating a vacuum over the damaged glass, the valve device opens by pressing into the borehole and the vacuum can extend into the isolated area.

In another favourable embodiment, the piston handle is adapted to indicate the current working position of the swivelling adjustable piston. The handle itself serves as an indicator of the current technological step, so the equipment need not be provided with an additional indicator.

In another favourable embodiment, the housing on the top side is fitted with a cover with a hole for the positioning head. The cover prevents dirt from entering the device, while the cover must be provided with a hole for the positioning head when the piston is pulled out of the body of the device.

In another favourable embodiment of the invention, the cover bears marks that provide information on the current working position of the swivelling adjustable piston. Although the interlocking groove does not allow the piston to be rotated into more positions at one time, the operator still needs to be have available information concerning which technological step the device is currently in.

In another favourable embodiment, the borehole for the glue supply valve for repairing damaged glass has a flat bottom. Varying shapes on the bottom when inserting the discharge pin resulted in stuck glue; experiments verified that a flat bottom achieves the best results in terms of discharging the entire content of glue.

In another favourable embodiment, the passageway for passage of the glue leads arranged at the bottom of the borehole for the glue supply valve. Extruded glue immediately leaves the borehole when inserting the glue supply valve, so no glue remains between the borehole and the valve.

The advantages of the appliance according to present invention are mainly that due to the structure of the overflow valve and other components and due to separation of the underpressure repair compartment and fixing compartment, keeping of constant underpressure or pressure in relevant phases of the repair procedure is achieved. Because no underpressure drops, it is not necessary to employ a work phase where increased underpressure is applied. The appliance fully avoids suction of the glue from the repair compartment to other compartments of the appliance and therefore, the appliance is not clogged by glue and the glue is applied only to the repair compartment. The advantages also include simplified handling during application of the glue. The appliance according to the invention is universally applicable for any type of viscous glue suitable for glass repair, without limitations to glues filled in capsules intended for perforating inside the appliance only. In addition, the appliance is characterized by easy production, low production costs, easy assembly and disassembly and failure-free operation.

DESCRIPTION OF THE DRAWINGS

The invention will be described in detail in the following Figures, where

FIG. 8, FIG. 9 and FIG. 10 show the appliance according to this invention in the first work position, FIG. 14, FIG. 15 and FIG. 16 show the appliance in the third work position when lifting the swivelling adjustable piston up, FIG. 17, FIG. 18 and FIG. 19 show the appliance in the third work position when pulling the swivelling adjustable piston down, FIG. 20, FIG. 21, FIG. 22 show the appliance in the fourth work position

DETAILED DESCRIPTION OF THE PREFERRED EMBODIMENTS

It is understood that specific embodiments of the invention described below are indicative only and do not in any way limit the embodiments of the invention to these specific shown here. The persons skilled in the art could find or derive under routine experimental procedures either higher or lower number of equivalents to specific embodiments of this invention being specially described here. These equivalents will be included in the scope of the following claims as well.

EXAMPLE 1

Figure 1:
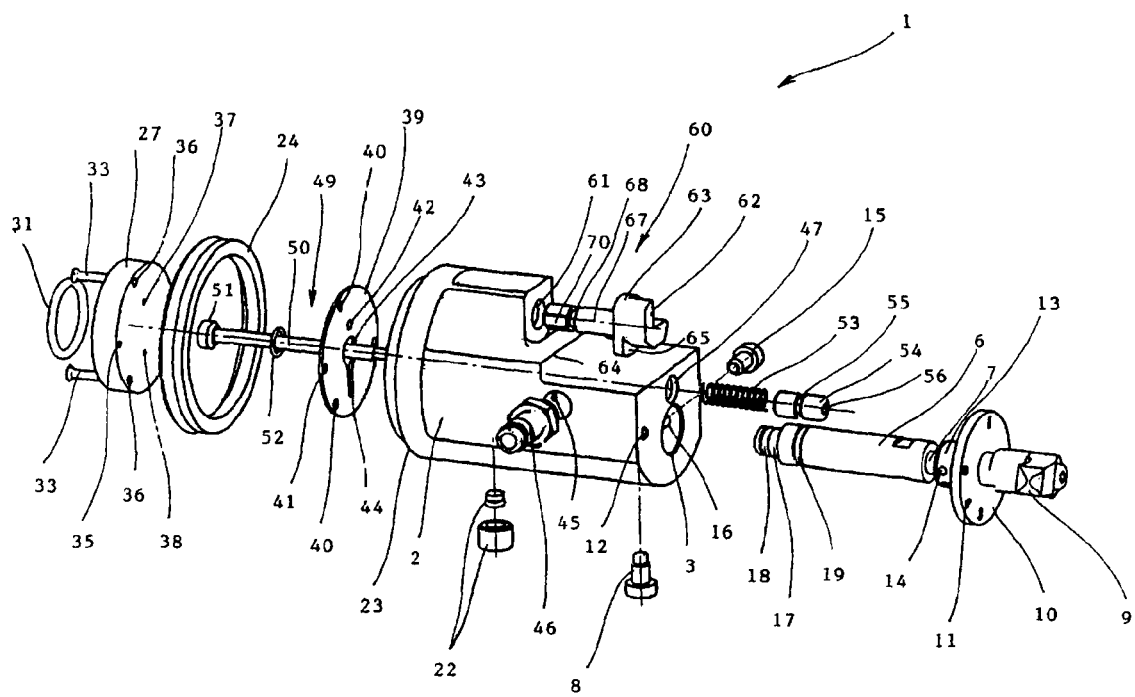
FIG. 1 shows general view on the appliance according to this invention in exploded view.

FIG. 1 shows general view on the appliance 1 according to this invention in exploded view for repairs of local damage to glasses 25. The appliance 1 consists of either metal or plastic body 2 roughly of cylindrical shape, consisting of cylindrical borehole 3 for steel swivelling adjustable piston 6. Close to orifices of the cylindrical borehole 3, there is indicator 12 on the body 2 and in opposite direction to this, there are marks 11 rotating to indicate individual work positions of the swivelling adjustable piston 6.

Guiding pin 8 engaging in the interlock groove 7 for the swivelling adjustable piston 6 penetrates to the borehole wall 3 in the body 2. The interlock groove 7 guides the piston 6 both during swivelling as well as vertical movement of the piston 6 that is possible in the third work position only.

The piston 6 has a flange 10 with handle 9 for simplified handling with the swivelling adjustable piston 6. At the same time, the flange 10 is equipped with marks 11 for identification of the piston 6 work positions and pressing projection 73, which is arranged just by the mark 11 symbolising the work position of the appliance 1 in which the overflow valve 49 is opened using the pressing projection 73 (see description below).

Figure 2:
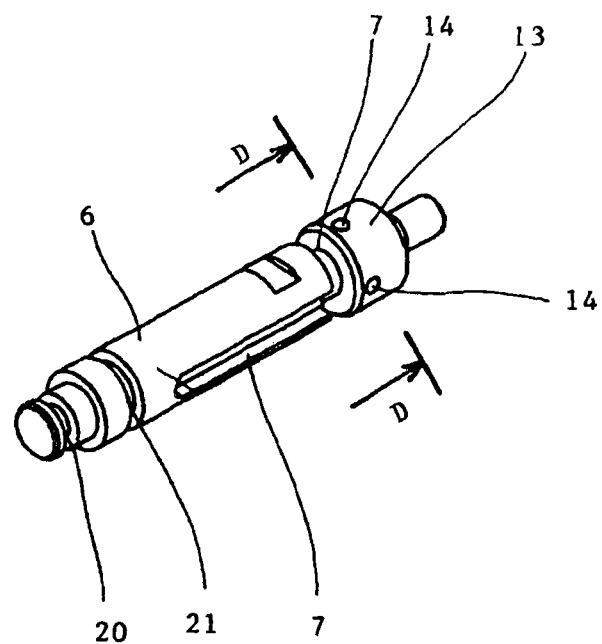
FIG. 2 shows general view to the swivelling adjustable piston.
Figure 3:
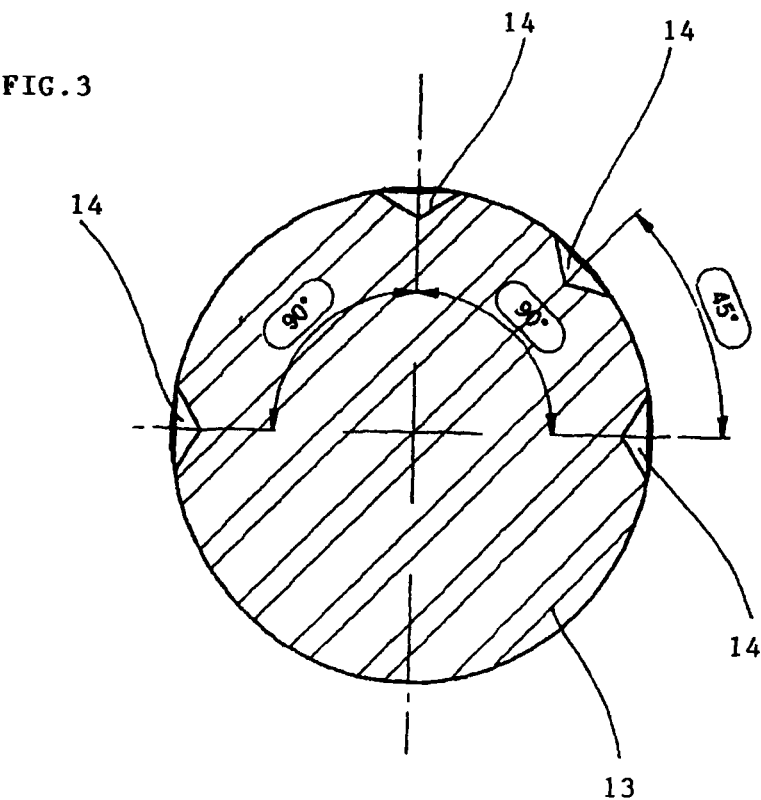
FIG. 3 presents a view of the positioning head of the swivelling adjustable piston.

Detailed view of the swivelling adjustable piston 6 on FIG. 2 shows groove 20 for the sealing ring 18, seating of front of the swivelling adjustable piston 6 and groove 21 for sealing ring 19 of the piston 6; in addition, FIG. 2 shows the interlock groove 7 and the positioning head 13 with arresting pits 14 on its circumference to fix the work positions of the piston 6 with the arresting pin 15. The arresting pin 15 is shown on FIG. 1 by the hole 16 that terminates to the borehole 3 in the body 2 and deployment of the arresting pits 14 along the circumference of the positioning head 13 of the piston 6 is shown in detail on FIG. 3 that shows the section of the piston 6 in the area of the positioning head 13.

Figure 4:
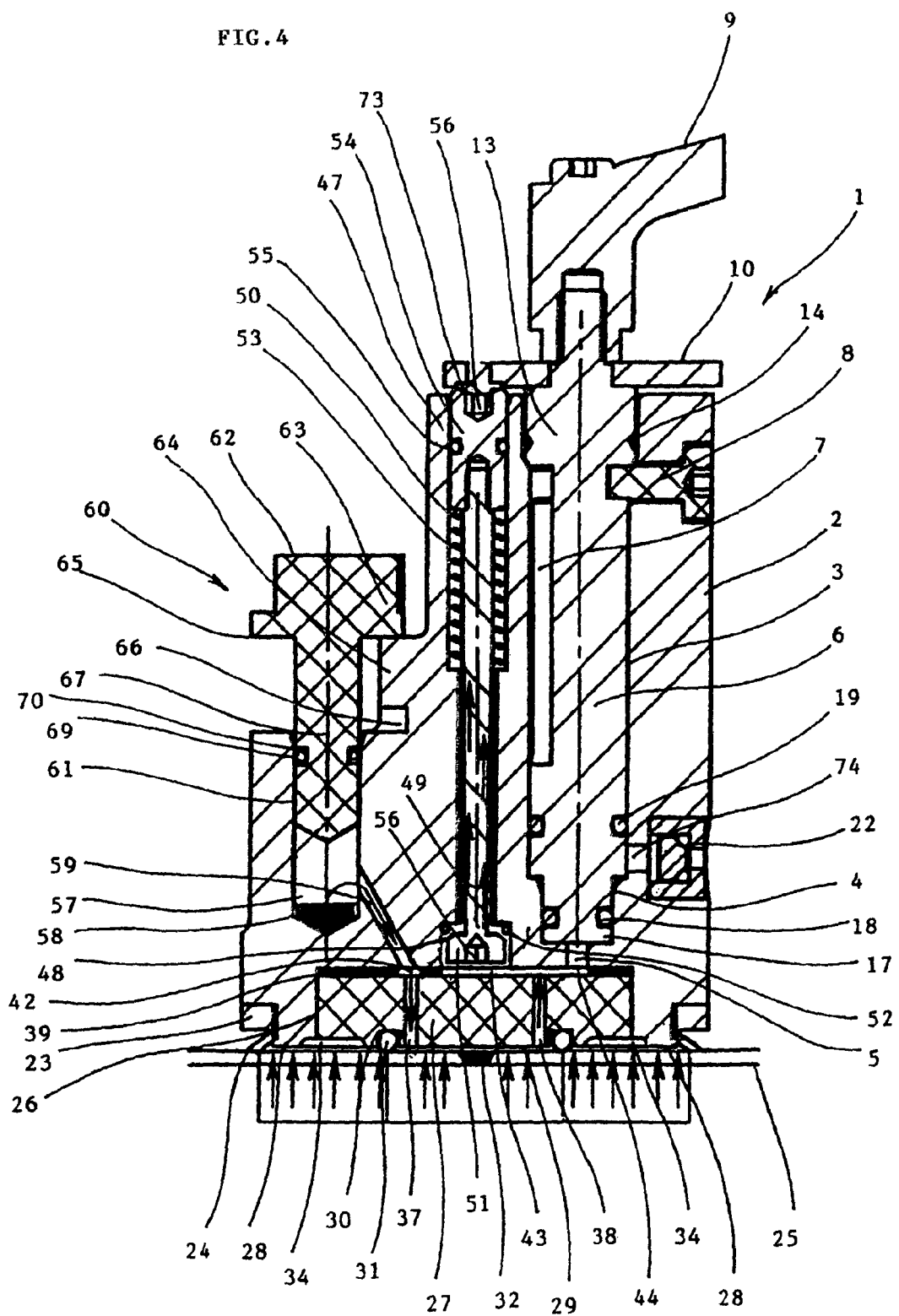
FIG. 4 presents a view of the appliance according to this invention in B-B plane identified on FIG. 9, FIG. 5 and FIG. 6 and FIG. 7 show the appliance according to this invention in home work position.

The body 2 is fitted with one-way suction valve 22 on the body side (see FIG. 1) that is connected using the air supply channel 74 coming through the body 2 with the borehole 3 as shown on FIG. 4.

The other important components of the appliance 1 shown on FIG. 1 are the circumferential elastomer gaskets 24 arranged on the circumference of the base 23 of the body 2, lid 27 of the body 2, bolts 33 for affixing of the lid 27, the gasket of the repair compartment 31, the overflow valve 49 and the flat gasket 39.

Arrangement of these components is shown on FIG. 4. The lid 27 of the body 2 is placed to the recess 26 of the base 23 of the body 2 and connected to the body 2 with bolts 33. The flat gasket 39 is inserted between the lid 27 and the recess bottom 26.

When placing the appliance 1 on the place of damage 32 of glass 25, the fixing compartment 28 and repair compartment 29 are created and they are visible on FIG. 4. The fixing compartment 28 has circle ring shape, defined on external circumference with elastomer gasket 24 and on internal circumference with gasket 31 of the repair compartment 29. The repair compartment 29 has circle shape defined by the gasket 31 that forms O-ring.

The repair compartment 29 and fixing compartment 28 are separated each other by vacuum as soon as the appliance 1 is pushed on glass 25 above the place of defect 32.

The lid 27 of the body 2 is equipped with groove 30 on the lower side for O-ring forming the gasket 31 of the repair compartment 29 as well as the distribution channel 34 for the underpressure distribution in the fixing compartment 28 that projects up to the recess edge 26. The lid 27 is fitted with the borehole 35 for underpressure supply to the fixing compartment 28, holes 36 for bolts 33, borehole 37 for glue supply 58 and borehole 38 for underpressure/pressure supply to the repair compartment 29. The boreholes 35, 37 and the holes 36 in the lid 27 are coaxial, which is favourable for the lid 27 production.

The flat gasket 39 is perforated with holes that correspond to the holes in the lid 27. These are the holes 40 for bolts 33, hole 41 for underpressure supply to the fixing compartment 28 and the hole 42 for glue 58 supply that correspond to the holes and boreholes 35, 36, and 37 in the lid 27 of the body 2, as well as flat gasket 39 fitted with the hole 43 for underpressure/pressure supply to the repair compartment 29, whereas the hole 43 is expanded to side by shape groove 44. The shape groove 44 in the flat gasket 39 allows easily to guide underpressure and pressure to the repair compartment 29 as described below.

The body 2 of the appliance 1 has channel 45 for underpressure supply to the fixing compartment 28 (see FIG. 5) that terminates to the borehole 71 for the connector 46 for connection of the air pump (not shown here). From the borehole 71 and through the body 2, the connection channel 72 is guided to the borehole 47 for the overflow valve 49. The seat 48 of the overflow valve 49 is located in the body 2 in the compartment above the recess 26 of the body base 2. As soon as the air pump (not shown here) is started, the underpressure is generated in the channel 45 and in the borehole 47 for the overflow valve 49.

Assembly of the overflow valve 49 on FIG. 1 comprises of the stem 50 of the overflow valve 49, closing member 51 with the gasket 52 of the overflow valve 49, spring 53 and pushing closure 54 of the overflow valve 49 with the gasket 55 of the closure 54. The pushing closure 54 of the overflow valve 49 is fitted with internal hexagon 56 as well as the closing member 51 in order to disassemble the assembly of the overflow valve 49.

Another important part of the appliance 1, body 2 shown on FIG. 1 is the borehole 61 for the valve 60 for glue supply 58, including visible arresting projection 64. FIG. 4, the borehole 61 for the valve 60 for glue supply 58 is terminated by the glue 58 bin 57. From the bin 57, there is a slanted channel 59 for glue supply 58 through flat gasket 39 to the borehole 37 in the lid 27 of the body 2. The channel 59 terminates in the borehole 61 above the glue 58 level in the bin 57.

The valve 60 of glue supply 58 on FIGS. 1 and 4 has stem 67, which is on one side terminated with a shape corresponding to the borehole 61 end shape and the bin 57 of glue 58, whereas the side wall of the stem 67 is fitted with groove 70 for overflowing of glue 58 from the bin 57 to the channel 59 in the body 2 for glue supply 58 to the repair compartment 29. On the other hand, the stem 67 of the valve 60 of glue supply 58 is fitted with head 62 that works as the arresting stop block 63, engaged in the arresting projection 64 of the body 2. The head 62 is fitted with arresting safety pin 65 that engages to the recess 66 in the body 2 under the arresting projection 64 for the safety pin 65 in case of swivelling the valve 60 of glue supply 58.

Tightness of the valve 60 of glue supply 58 is provided by the gasket 69 engaged in the groove 68 on the stem 67.

The appliance 1 for repair of local damage to glass 25 according to embodiment of the invention works in fire work positions of the swivelling adjustable piston 6 being identified by position of the marks 11 on the flange 10 against the indicator 12 on the body 2 of the appliance 1 as well as vertical position, i.e. lifting up or pressing down the piston 6. Individual work positions of the appliance 1 will be described in detail below:

Home (zero) work position—fixing of the appliance 1 on glass 25 and pouring of glue 58 to the bin 57

First work position—creating of underpressure in the repair compartment 29 and above glue 58

Second work position—squeezing of glue 58 to the repair compartment 29

Third work position—first phase—removal of underpressure in the repair compartment 29
second phase—developing of pressure on glue 58 in the repair compartment 29

Fourth work position—flowing of glue 58 to break point 32

Fifth work position—disassembly of appliance 1 from the glass 25

Figure 5:
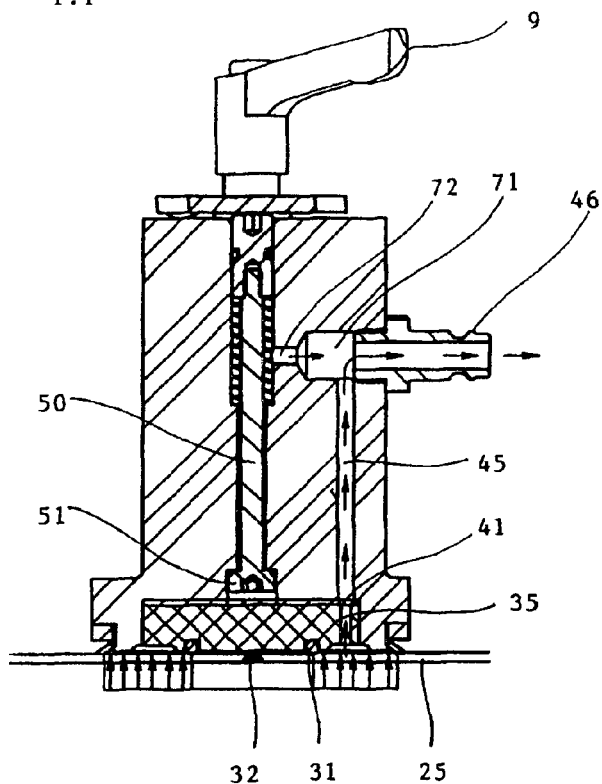
Figure 6:
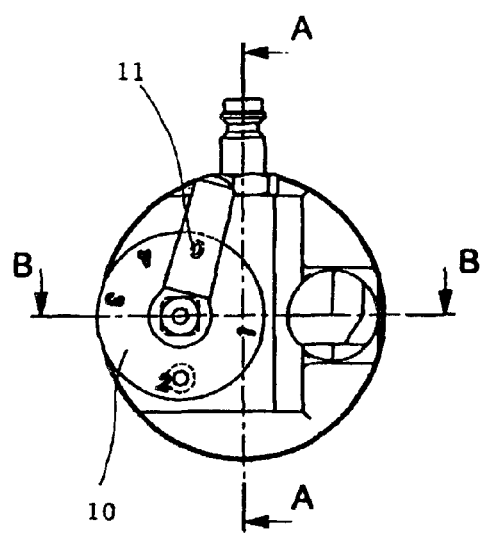
Figure 7:
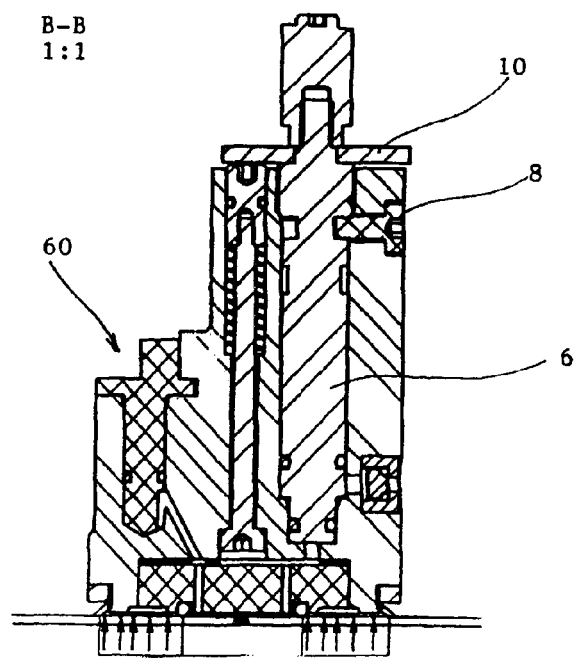

In the home working position shown on FIG. 5, FIG. 6 and FIG. 7 the air pump (not shown here) is connected to the appliance 1 via the connector 46, the swivelling adjustable piston 6 is set by the handle 9 to home work position indicated by mark 11 and indicator 12 (not visible in this piston 6 position because they are hidden by the handle 9), the valve 60 for glue supply is left arrested in its borehole 61 and the appliance 1 is placed on glass 25 so that the repair compartment 29 is located above break point 32 of glass 25. The overflow valve 49 is closed.

After placing the appliance 1 above break point 32 of glass 25, the air pump is turned on and the developed underpressure is spread by the connector 46 for connection of the air pump to the borehole 71 from where underpressure is distributed around the stem 50 to closed closing member 51 of the overflow valve 49, therefore the overflow valve 49 is air-sealed by pressure of the closing member 51 via the stem 52 to the seat 48 and no underpressure is furthermore distributed. However, underpressure is distributed via the supply channel 45 through hole 41 in the flat gasket 39 and hole 35 in the lid 27 of the body 2 to the fixing compartment 28 in the circular ring between the circumferential elastomer gasket 24 and gasket 31, which makes the appliance 1 fixed on the repaired glass 25.

The valve 60 of glue supply 58 is removed from the borehole 61 and the bin 57 is filled with loose liquid glue 58 in quantity required for repair. It is important that the glue 58 level in the bin 57 is lower than the channel orifice 59. After pouring of the glue 58 to the bin 57, the valve 60 is inserted to the borehole 61, arrested by arresting stop block 63 on the arresting projection 64 of the body.

In alternative procedure for glue 58 filling in the bin 57, the appliance 1 is stood upright on an absorbent pad to dose the glue 58 to the bin 57 yet before fixing on the glass 25 in the home work position. The valve 60 for glue 58 supply is inserted in the borehole 61 and arrested in the arresting pin 64 by the arresting stop block 63. Inserting of the valve 60 to the borehole 61 squeezes excessive glue 58 from the bin 57 and the glue 58 evacuates the appliance 1 through the channel 59 via lid 27 by the borehole 37 for glue supply 58 to the absorbent pad and in this way, correct glue 58 quantity is calibrated yet before affixing the appliance 1 in the home work position.

The air pump, being continuously enabled throughout the term of the glass 25 repair, keeps the underpressure in the fixing compartment 28, borehole 71 for the connector 46 of the air pump, connecting channel 72 and in the borehole 47 for the overflow valve 49.

The first work position is shown on FIG. 8, FIG. 9 and FIG. 10. It is set so that the appliance 1 operator changes the swivelling position of the piston 6 by the swivelling handle 9 in correct direction according to mark 11 and indicator 12, i.e. the mark 11 of the first work position faces to the indicator 12.

When swivelling of the adjustable piston 6 to the first work position, the pushing closure 54 of the overflow valve 49 is pressed by the pressing projection 73 located on the flange 10 of the piston 6, which causes opening of the overflow valve 49. The underpressure is distributed by the hole 43 in the flat gasket 39 and through the borehole 38 via the lid 27 of the body 2 to the repair compartment 29 including damage cracks 32 of the glass 25 and at the same time, air is removed from the bin 57 above the glue 58, including the channel 59 and hole 42 for glue 58 supply without pushing in the valve 60 of the glue 58 supply by underpressure to the borehole 61 because it is secured by the arresting stop block 63 and the arresting pin 64.

Figure 11:
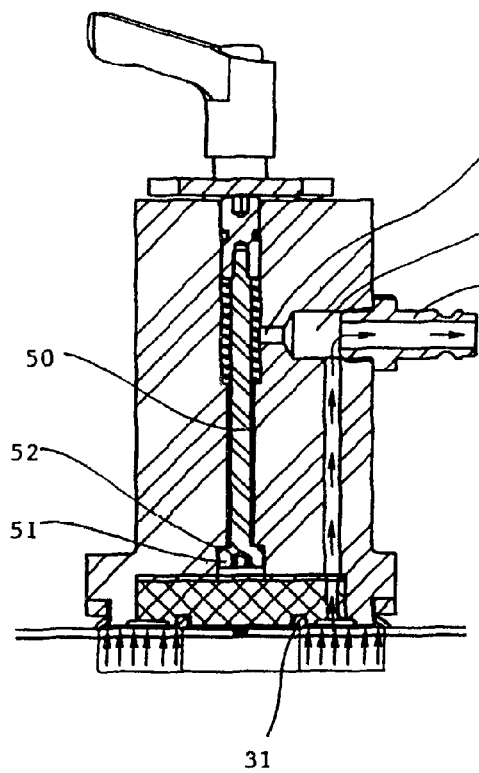
FIG. 11, FIG. 12 and FIG. 13 show the appliance in the second work position.
Figure 12:
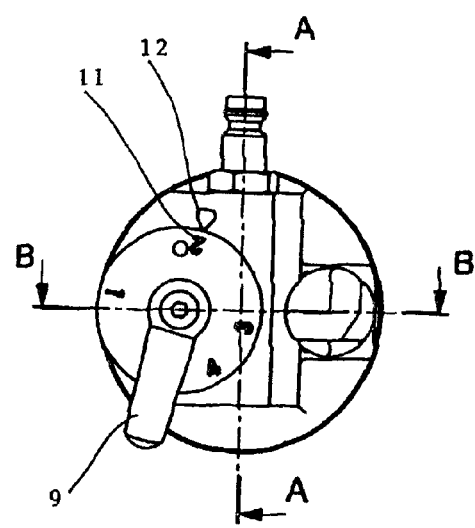
Figure 13:
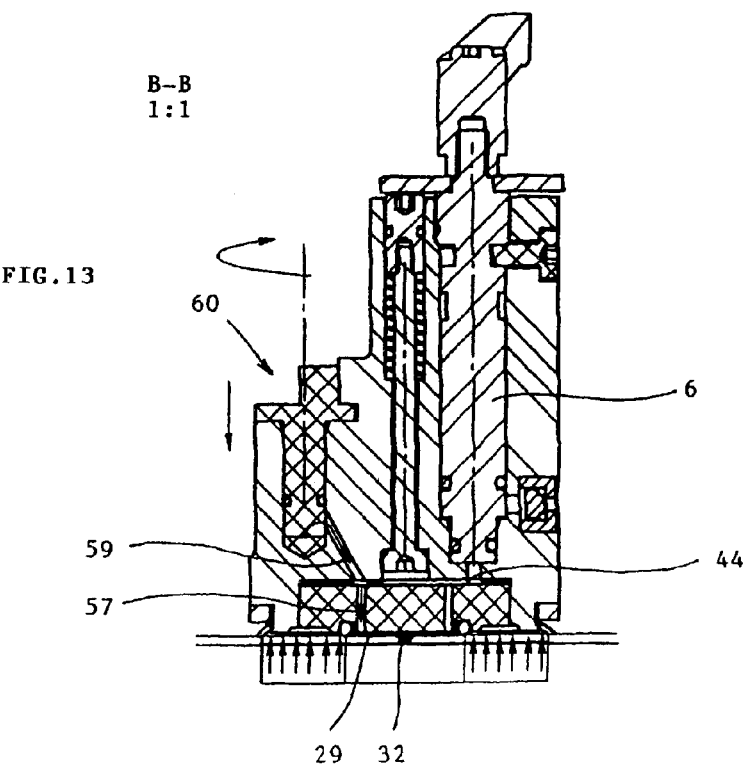

In the second working position shown on FIGS. 11, 12, and 13, swivelling of the adjustable piston 6 to the second working position according to the mark 11 against the indicator 12, the overflow valve 49 closes because the pressing projection 73 of the flange 10 changes its position out of the pushing closure 54 and the closing member 51 of the overflow valve 49 again sits in the seat 48 in the body 2. The underpressure present will force to the overflow valve 49 in closing direction and tightness of the overflow valve 49 will further increase because the underpressure forces on the closure of the closing member 51 in addition to the spring 53.

In addition, the valve 60 for the glue 58 supply is manually swivelled in the second work position and the valve 60 engages in the borehole 61 in the body 2, whereas the valve 60 is pulled into also by the underpressure via the channel 59 and it is secured by the arresting safety pin 65 in the recess 66 for said safety pin 65. As soon as the valve 60 drives to the borehole 61, the glue 58—due to its incompressibility—is forced to escape from the bin 57 of the glue 58 through the groove 70 along the stem 67 and then via the channel 59 for supply to the repair compartment 29 via hole 42 in the flat gasket 39 and via the borehole 37 in the lid 27 of the body 2 to the repair compartment 29 where the glue 58 is poured on the break point 32 of the glass 25. Due to presence of the underpressure, a small portion of the glue 58 is stuck after pouring to the repair compartment 29 to the borehole 38 for the underpressure/pressure supply to the repair compartment 29 from where the glue 58 is subsequently squeezed to the break point 32 of the glass 25 by the piston pressure 6 in the next work position. It is favourable if the borehole 37 for glue supply and the borehole 38 for underpressure/pressure supply in the lid 27 are arranged in the opposite sections of the repair compartment 29 so that as least as possible glue 58 is stuck to the borehole 38 for the underpressure/pressure supply by the present underpressure.

In the third work position, where the mark 11 of the third work position turns against the indicator 12, the swivelling adjustable piston 6 becomes able to move vertically because the guiding pin 8 stops hindering that movement thanks to the position of the interlock groove 7 on the piston 6. The third work position is divided into the telescopic position identified as the first phase, shown on FIG. 14, FIG. 15 and FIG. 16 and the piston pressing position identified as the second phase, shown on FIG. 17, FIG. 18 and FIG. 19.

In the first phase of the third work position, when pulling the piston 6 out, air is delivered by one-way suction valve 22 to the cylindrical borehole 3 in the body 2 and at the same time, the delivered air fills the shape groove 44 with hole 43 via the channel 5 for pressure supply in the flat grease 39 and through the borehole 38 in the lid 27 of the body 2, air gets up to the repair compartment 29 above flowing glue 58 to the break point 32 of glass 25.

In the second phase of third work position, the piston 6 is compressed and during compression, the pressure acts from downside to the closing member 51 of the overflow valve 49 and to the glue 58 in the repair compartment 29. Because pressure acts in closing direction in this position to the closing member 51 of the overflow valve 49, this phase does not cause any pressure or underpressure drop across the appliance 1 due to leaks of the overflow valve 49 and the constant air pressure presses the glue 58 successively to all break points 32 of the glass 25 without either pulling in or pushing out the glue 58 elsewhere. If needed, the vertical movement of the piston 6 can be repeated several times in order to achieve sufficient pressure in the repair compartment 29.

During the fourth work position shown on FIG. 20, FIG. 21 and FIG. 22, the mark 11 of the fourth work position is set against the indicator 12 by swivelling the piston 6 by 45°, which makes the piston 6 secured only against vertical movement by the guiding pin 8 and the operator waits until proper pushing of the glue 58 to all cracks and the extreme areas of the break point 32 of the glass 25. In this way, the pressure acts constantly for time required.

Figure 23:
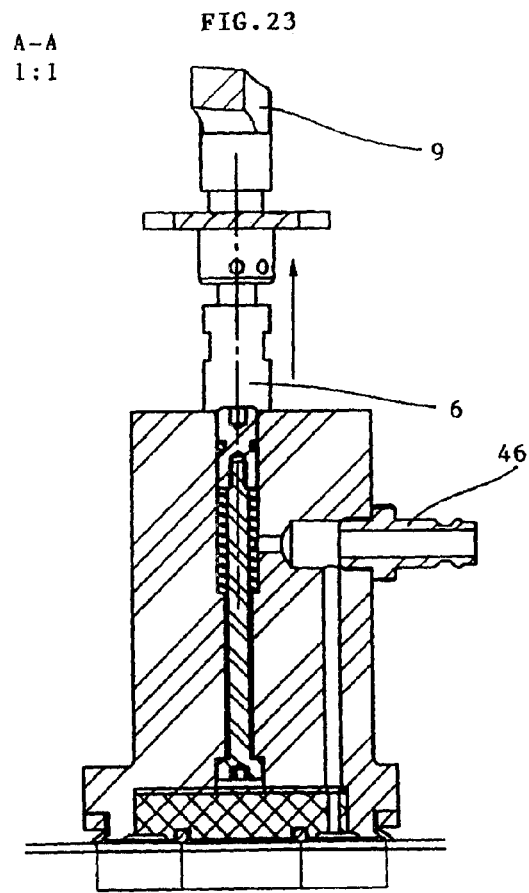
FIG. 23, FIGS. 24 and 25 show the appliance during disassembly from glass.
Figure 24:
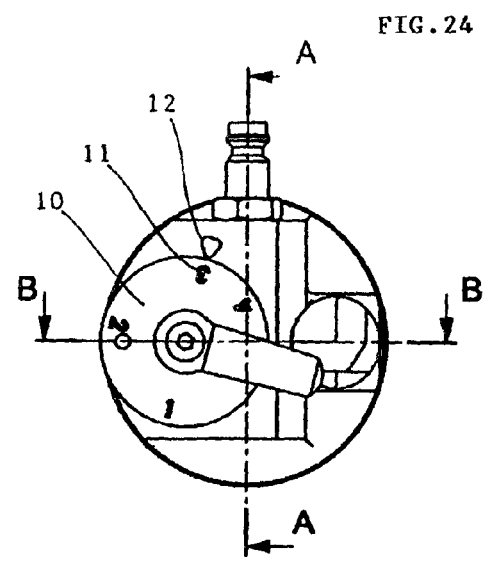
Figure 25:
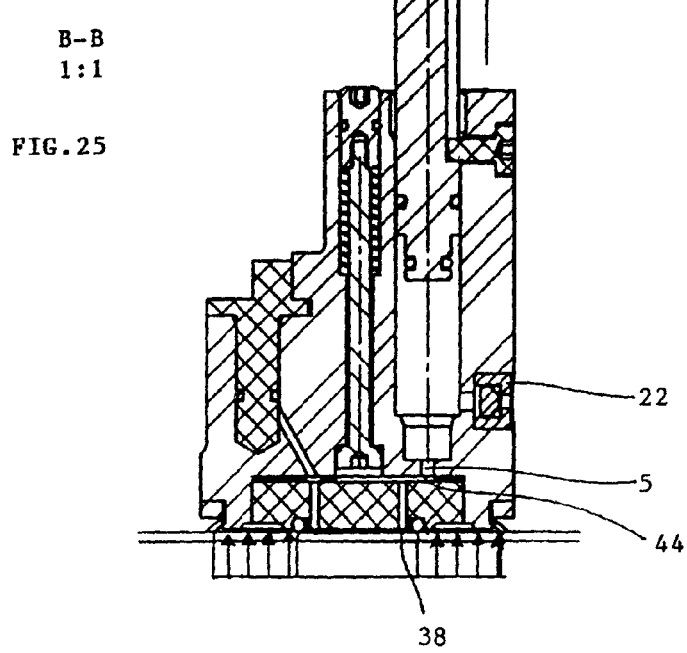

In the fifth working position shown on FIG. 23, FIG. 24 and FIG. 25, the piston 6 returns to the third work position identified by the mark 11 when directing to the indicator 12, i.e. in fact back to the third work position and due to existing pressure, the piston 6 pulls out and the pressure present in the repair compartment 29 developed by previous pushing of the piston 6 is reduced to minimum. The air pump is turned off, the underpressure from the fixing compartment 28 is removed and the appliance 1 is removed from the repaired glass 25. The piston 6 returns into home work position and the appliance 1 is ready for use again.

EXAMPLE 2

Figure 26:
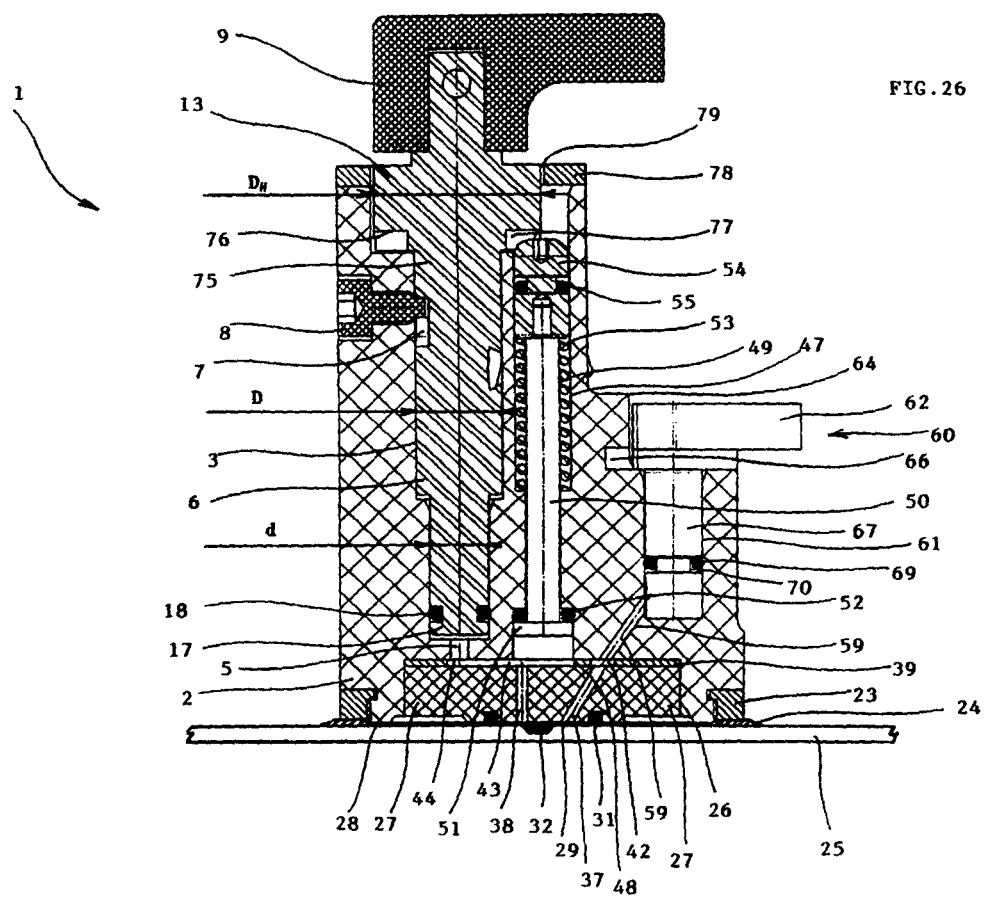
FIG. 26 shows a cross-section of the appliance without the suction valve.

FIG. 26 shows a cross-section of the appliance 1 for repairing damage 32 to layered glass 25. Part of the appliance 1 is a steel swivelling adjustable piston 6, which is set into a cylindrical borehole 3 in a plastic body 2 of the appliance 1. The borehole 3 in the site of the seating 17 of the front of the piston 6 at diameter d with a size of 10 mm and in the site of the upper seating 75 has a diameter D with a size of 18 mm. The swivelling adjustable piston 6 controls the function of the appliance 1 so that in each working position it allows the operator of the appliance 1 to carry out only one technological step. This is achieved by machining an interlock groove 7 in the body of the adjustable piston 6, through which runs the guiding pin 8. If the operator of the appliance 1 wants to manipulate with the adjustable piston 6 other than a way permitted by the current technological step, the guiding pin 8 makes such a movement impossible.

Another function of controlling the swivelling piston 6 lies in the pushing control of the valve device, created by an overflow valve 49 which is set into a borehole 47 drilled into the body 2 next to the borehole 3. The borehole 47 has two distinct diameters. The upper half of the borehole 47 has a wider diameter for holding a spring 53. The overflow valve 49 consists of a closing member 51 abut against the sealing rubber washer 52 located in the seat 48, which is fixed to the body 2 in the lower part of the borehole 47. The closing member 51 is connected by steel valve stem 50 with pushing closure 54, which has a larger diameter than the valve stem 50. The seat 48 with sealing washer 52 is created at the end of the borehole 47, while the pushing closure 54 of the overflow valve 49 is stored in a wider upper borehole 47 and the stem 50 passes through the entire borehole 47. Between the pushing closure 54 and transition from the upper wider half of the borehole 47 on the narrower part of the borehole 47 there is a spring 53 stored. The bottom end of the spring 53 is pressed against the body 2 in the borehole 47 while the upper end is pressed against the lower side of the pushing closure 54, so that the force of the spring 53 closes the valve device at the site of the seat 48 and the sealing washer 52.

When working with the appliance 1 the overflow valve 49 is pushed into the borehole 47, or is contrarily released depending on the current technological step in which the appliance 1 is found. This is achieved in that above the upper seating 75 of the adjusting piston 6 there is a machined positioning head 13 with diameter $D_H$ and size 26 mm, which is an integral part of the adjustable piston 6 and is distinct from the adjustable piston 6 by a larger diameter, which is evident when looking at the formed overlap 76. The overlap 76 of the positioning head 13 reaches beyond the pushing closure 54. So that the overlap 76 does not exert continuous pressure on the pushing closure 54, there is an overlap recess 77 on the overlap 76, which has a changing depth with the corresponding position of the swivelling adjustable piston 6 in various technological steps, so that the overflow valve 49 is pushed by the positioning head 13 only in certain positions of the adjustable piston 6, when it is necessary to open the valve device with pressure and create a vacuum at the site above the damage 32 to the glass 25. In other positions of the swivelling adjustable piston 6 the overflow valve 49 is closed by a spring 53.

Figure 27:
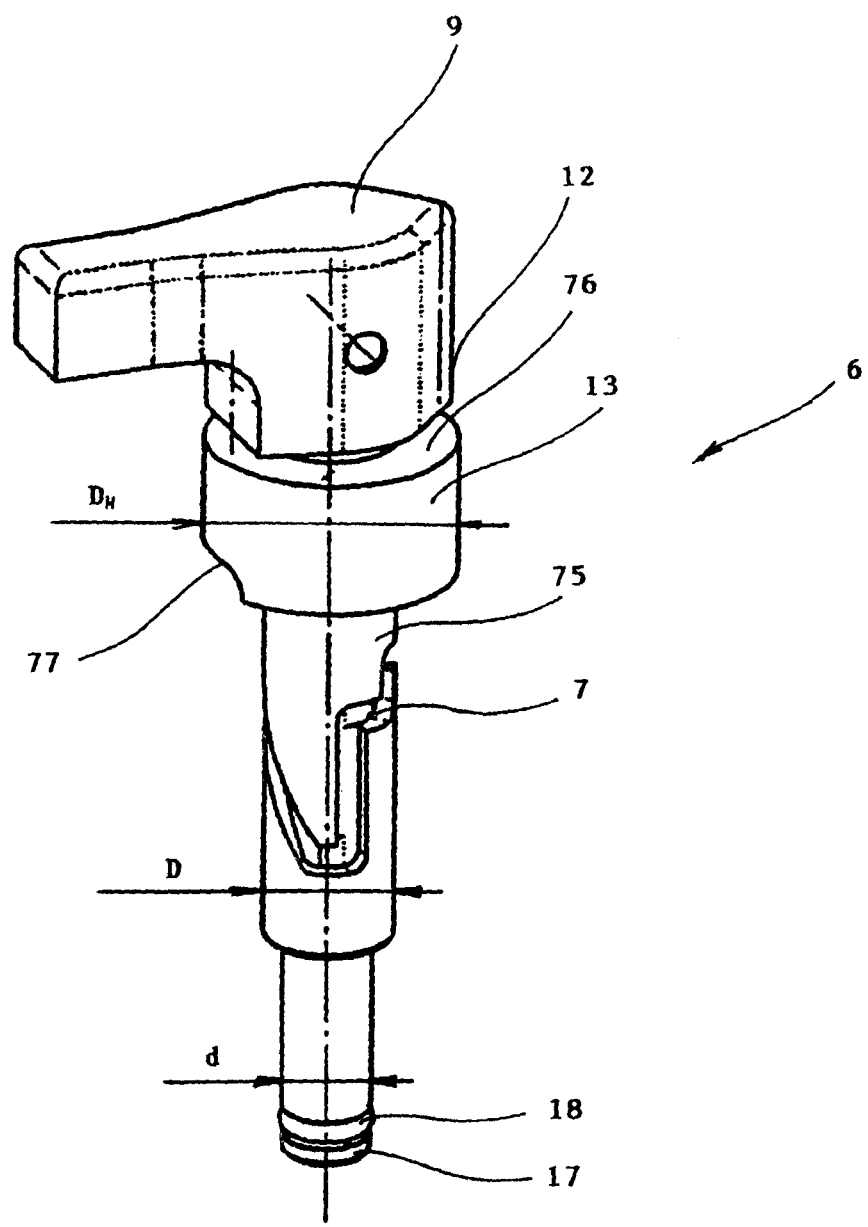
FIG. 27 shows a side view of the swivelling adjustable piston on the appliance without the suction valve.
Figure 28:
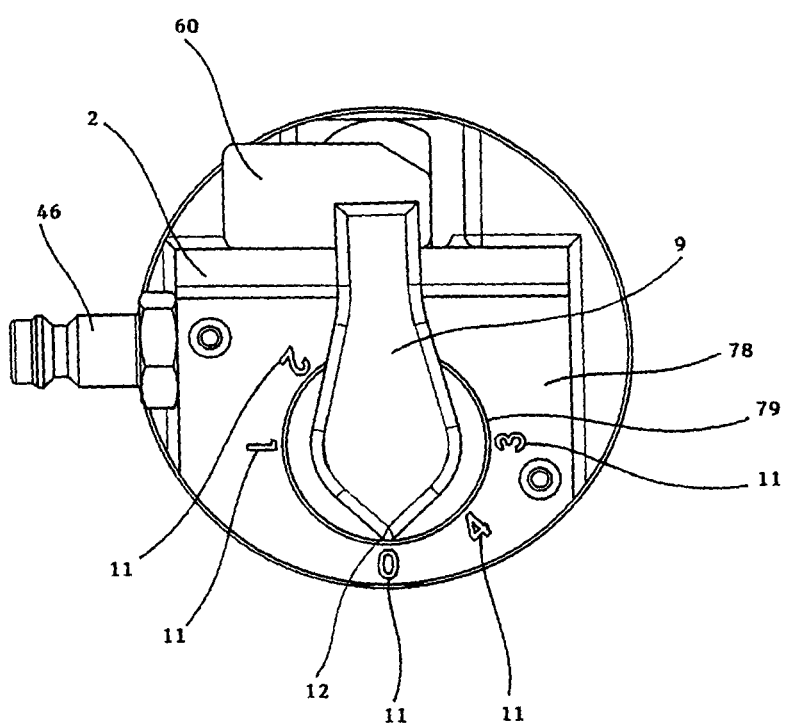
FIG. 28 shows a view from above onto the appliance without the suction valve.

The interlock groove 7, as shown in FIG. 27 which shows a side view of the adjustable piston 6, and which enables manipulation with the adjustable piston 6 only in one movement because other movements are blocked by the guiding pin 8 screwed into the body 2, which is blocked from movement by the remaining non-machined cladding of the adjustable piston 6.

On the seating 17 of the front of the adjustable piston 6 there is a recess created with rubber sealing ring 18 in the shape of an O-ring. The sealing 18 prevents the passage of air, so the adjustable piston 6 is air-tight in its lowest position. In the event that the adjustable piston 6 is pulled out in a certain technological step, air is drawn in below the adjustable piston 6, since the sealing 18 moves to the wider part of the borehole 3. When the adjustable piston 6 is pressed back to its lowest position, the air is captured in the narrower part of the borehole 3, where increased pressure is created.

So that the operator of the appliance 1 knows exactly at which technological step the appliance 1 is found, and so that the appliance 1 is protected from dirt, the body 2 on the upper side is equipped with a plastic upper cover 78, into which a hole 79 is drilled for the free passage of the positioning head 13. On the cover 78 there are numbers stamped which serve as marks 11 for identifying the technological step of the adjustable piston 6. These marks 11 are indicated by the indicator 12 made up of the pointed end of the aluminium handle 9 of the piston 6, which is screwed to the positioning head 13.

FIG. 26 also shows the borehole 61 for the valve 60 for the supply of glue 58, on the bottom of which is carried out the storage of the dosage of glue 58 for repairing damage 32 to layered glass 25. The borehole 61 has a flat bottom, so that the glue 58 does not get stuck inside. From the borehole 61 in the side wall above its bottom there is a channel 59 drilled for release of the pressurized glue 58 for the damaged 32 glass 25. The channel 59 passes through the body 2 of the appliance 1, including the lid 27 of the body 2. The glue 58 is pressed out of the borehole 61 through the valve 60.

The appliance 1 functions throughout the individual technological steps as follows:

Step 0:

The appliance 1 is placed concentrically on the site of the damaged 32 glass 25. It is connected to an air-pump (not pictured) through a connector 46, which, when turned on, begins to create a vacuum through the distribution channel 34 for creating a vacuum beneath the lid 27 into the fixing compartment 28. The necessary dose of glue 58 is applied into the borehole 61 and the valve 60 is inserted, which is secured in a retracted and rotated position above the dose of glue 58 for repairing damaged 32 glass 25 by the arresting projection 64 created on the body 2.

Step 1:

The appliance 1 is now firmly attached, so the operator may now turn the adjustable piston 6 to technological step 1, resulting in pressure on the overflow valve 49 by the positioning head 13 and in opening the closing member 51 from the sealing 52. The vacuum spreads into the repair compartment 29, including all microscopic cracks in the glass 25 in the damaged area 32 and through the channel 59 and above the surface of the dose of glue 58 stored in the borehole 61, covered by the retracted, rotated, and arrested valve 60.

Step 2:

By rotating the adjustable piston 6, including the positional head 13, the overflow valve 49 closes, and above the site of the damaged 32 glass 25 an isolated vacuum forms. The operator of the appliance 1 rotates, thus releasing the valve 60 from the arrested projection 64, which is pulled into the borehole 61 by the created vacuum and presses on the surface of the dose of glue 58, which moves through the channel 59 into the repair compartment 29 of the damaged 32 glass 25, where it flows for approximately one minute. The valve 60 in its retracted position is rotated to secure it into the safety pin recess 66. The vacuum in the microscopic cracks results in the glue 58 having an increased flow.

Step 3:

In this position of the adjustable piston 6 the interlock groove 7 with guiding pin 8 allows for the movement of the adjustable piston 6 along the vertical axis. The overflow valve 49 is closed; the valve 60 is completely retracted into the borehole 61 and is constantly arrested. By pulling out the adjustable piston 6 to its highest position, the operator removes the vacuum above the damaged 32 glass 25 with flowing glue 58, since the adjustable piston 6 in its highest position is not sealed, because the borehole 3 is wider in its central part than the front seating 17 of the adjustable piston 6 with set sealing 18. After the air is taken in, the operator presses to return the adjustable piston 6 to its lowest position, which not only begins to seal again, but also increases the pressure above the damaged 32 glass 25. The rotationally adjustable piston 6 is rotated under pressure into technological step 4, where it is secured against ejection by the increased pressure. The increased pressure acts on the glue 58 in the damaged area 32 of the glass 25 and the glue 58 thus flows into the most distant cracks where it normally would not flow e.g. under the capillary action of liquids. The increased pressure is left to work for at least 2 minutes.

Step 4:

The adjustable piston 6 is returned to technological step 3, and pulling it out returns the increased vacuum to the value of the local atmospheric pressure, then the air-pump attachment is disconnected and the appliance 1 is removed from the glass.

After completion of repair, the lid 27 of the appliance 1 is wiped to remove stuck drops of glue 58, the glue supply valve 60 is ejected, and the adjustable piston 6 is returned to position 0, at which point the appliance 1 is ready for repeated use.

INDUSTRIAL APPLICABILITY

The appliance according to this invention can be mainly used for repairs of local damage to laminated glasses, particularly windscreens of cars and of other transportation means, where surface is chipped off on a small surface area due to collision with small things such as small stones.

OVERVIEW OF THE POSITIONS USED IN THE DRAWINGS 1 appliance for repairs of local damage of glass
2 body
3 cylindrical borehole for swivelling adjustable piston
4 seating of cylindrical borehole
5 channel for pressure supply to repair compartment
6 swivelling adjustable piston
7 interlock groove for positioning of piston
8 guiding pin of interlock groove
9 piston handle
10 flange
11 mark
12 indicator
13 positioning head
14 arresting pit
15 arresting pin
16 hole for arresting pin
17 seating of piston front
18 sealing ring for seating of piston front
19 piston sealing ring
20 groove for sealing ring for seating of piston front
21 groove for piston sealing ring
22 one-way suction valve
23 body base
24 circumferential elastomer gasket
25 glass
26 body base recess
27 body lid
28 fixing compartment
29 repair compartment
30 groove for repair compartment gasket
31 repair compartment gasket
32 damage
33 bolt
34 distribution channel for underpressure distribution in fixing compartment
35 borehole for underpressure supply to fixing compartment
36 bolt hole
37 borehole for glue supply
38 borehole for underpressure/pressure supply to repair compartment
39 flat grease
40 bolt hole 41 underpressure supply hole to fixing compartment
42 hole for glue supply
43 underpressure supply hole to repair compartment
44 shape groove
45 channel in body for underpressure supply to fixing compartment
46 air pump connector
47 borehole for overflow valve
48 seat for overflow valve
49 overflow valve
50 overflow valve stem
51 closing member of overflow valve
52 sealing of closing member of overflow valve
53 overflow valve spring
54 pushing closure of overflow valve
55 closure gasket of overflow valve
56 inner hexagon
57 glue bin
58 glue
59 channel in body for glue supply to repair compartment
60 glue supply valve
61 borehole for glue supply valve
62 glue supply valve head
63 arresting stop block of glue supply valve
64 arresting projection of body
65 arresting safety pin of glue supply valve
66 recess for safety pin
67 glue supply valve stem
68 glue supply valve stem gasket groove
69 glue supply valve stem gasket
70 groove for overflowing of glue from bin to channel
71 borehole for air pump connector
72 connecting channel
73 pressing projection of flange of swivelling adjustable piston
74 air supply channel
75 upper seating of the piston
76 overlap
77 overlap recess
78 upper cover
79 hole in the cover
d diameter of the piston in lower seating
D diameter of the piston in upper seating
$D_H$ diameter of the positioning head

The invention claimed is:

1. An appliance for repairing a local damage area of laminated glass for cars and other transportation means comprising:
   a body with a body base fitted with a circumferential elastomer gasket forming a fixing compartment mountable to said laminated glass using underpressure from an air pump connected to said body though a first connector and connected to said body base through a side borehole to created underpressure in said fixing compartment;
   a removable lid is mounted inside a recess formed in said body base with a gasket mounted onto the lower surface of said removable lid to separate a repair compartment from said fixing compartment;
   wherein said removable lid includes a first borehole for supplying said underpressure or pressure to said repair compartment in communication with a first cylindrical borehole formed in an axial direction of said body and in connection with said first connector;
   wherein a second borehole in said removable lid supply glue to said repair compartment in communication with a first channel connected to a second cylindrical borehole formed in said axial direction of said body;
   a swiveling adjustable piston positioned in said first cylindrical borehole for controlling work position of said appliance and development of pressure in said repair compartment;
   a valve device consisting of an overflow valve installed in a third cylindrical borehole adjacent to said first cylindrical borehole, fitted with a control arranged outside said body and connecting said first borehole in said removable lid to control underpressure in said repair compartment guided by said swiveling adjustable piston;
   wherein said valve device comprising a closing member arranged when closing said overflow valve, said closing member moves in underpressure suction direction from the repair compartment; and
   an air supply device connected to the first cylindrical borehole to supply pressure to said repair compartment connected together through a second channel and controlled by said swiveling adjustable piston.

2. The appliance according to claim 1, wherein said first borehole in said removable lid for supplying underpressure to said repair compartment is furthermore connected to a third channel for pressure supply to said repair compartment; and
   said third channel is positioned between said recess for said removable lid and said first cylindrical borehole.

3. The appliance according to claim 2, wherein a flat gasket with a first hole for underpressure supply to said repair compartment is positioned in said recess between said body base and said removable lid;
   said first hole is arranged under an outfall of said overflow valve and provided with a shaped groove protruding above an orifice of the said first borehole in said removable lid for supplying underpressure/pressure to said repair compartment and under an orifice of said second channel for pressure supply to said repair compartment.

4. The appliance according to claim 3, wherein said flat gasket is fitted with a second hole for underpressure supply to said fixing compartment;
   said second hole connects to said side borehole independently to provide underpressure in said removable lid and connecting said fixing compartment with said second channel for underpressure supply to said fixing compartment in said body.

5. The appliance according to claim 3, wherein in said second borehole of said removable lid supplies glue to said repair compartment and said flat gasket has a third hole for said second borehole that connects said second borehole with said first channel in said body for glue supply to said repair compartment.

6. The appliance according to claim 5, wherein said second borehole in said removable lid and said first borehole in said removable lid are arranged in opposite areas of said removable lid;
   wherein said opposite areas are outside an area of projection of said overflow valve;
   wherein said first hole for underpressure supply to said repair compartment in said flat gasket is arranged in said area of projection of said overflow valve.

7. The appliance according to claim 1, wherein said air supply device is connected to a lower part of said cylindrical borehole in said body with an one-way suction valve installed between said air supply device and said body.

8. The appliance according to claim 7, wherein a lower part of said first cylindrical borehole is fitted with a seating that engages a seating of piston front of said swiveling adjustable piston;
    wherein said piston in an area above said seating of piston front is fitted with a first sealing ring and in an area of said seating of said first cylindrical borehole, said piston front is fitted with second sealing ring; and
    between said first and second sealing rings there is an air supply channel for air supply from said one-way suction valve.

9. The appliance according to claim 8, wherein said air supply channel terminates on a bottom of said seating of said first cylindrical borehole and formed in an axis of said swiveling adjustable piston.

10. The appliance according to claim 1, wherein said third cylindrical borehole further comprising a notch forming a third seat of said overflow valve with a seat gasket, which engages said closing member of said overflow valve;
    a stem connected to said overflow valve and connected with said closing member in a movable placement in said third cylindrical borehole; and
    connected to an overflow valve control to control said overflow valve.

11. The appliance according to claim 10, wherein at an end of said stem comprising a demountable pushing closure with a gasket;
    said pushing closure is arranged on a spring in an expanded upper section of said third borehole for said overflow valve;
    wherein said expanded upper section of said third borehole is connected with a second connector for an air pump connection using a connection channel; and
    said pushing closure is adapted for connection with said overflow valve control.

12. The appliance according to claim 11, wherein said overflow valve control consists of a flange fixed on said swiveling adjustable piston outside said body.

13. The appliance according to claim 12, wherein said flange is a round shape with a lower section fitting against said pushing closure with at least one pressing projection; and
    said pushing closure has a corresponding shape recess in an upper side to accept said pressing projection.

14. The appliance according to claim 12, wherein an upper section of said swiveling adjustable piston is fitted with a positioning head installed in an expanded section of said first cylindrical borehole and fitted with arresting pits on a circumference of said positioning head and angular positions correspond to individual angular work positions of said swiveling adjustable piston; and
    wherein said arresting pits house an arresting pin penetrating to said first cylindrical borehole.

15. The appliance according to claim 14, wherein said flange is fixed on said swiveling adjustable piston outside said body above said positioning head and fitted with marks corresponding to individual work positions of said swiveling adjustable piston; and
    wherein at least one indicator is available on said body in opposite direction to said marks.

16. The appliance according to claim 1, wherein said body base, said recess for said removable lid, said removable lid, and said flat gasket have round shape and are arrange in a coaxial direction; and
    wherein an axis of said overflow valve is at their central axis and an axis of said swiveling adjustable piston is parallel to said axis of said overflow valve.

17. The appliance according to claim 1, wherein said swiveling adjustable piston is fitted with an interlock groove that engages a guiding pin installed in said body and penetrating to said first cylindrical borehole; and
    wherein said interlocking groove consists of a circular circumferential groove for swiveling position and a vertical guiding groove for vertical movement of said swiveling adjustable piston in said first cylindrical borehole.

18. The appliance according to claim 1, wherein said body has a bin for loose liquid viscous glue; and
    wherein an orifice of said first channel is positioned in said bin above a level created by a glue volume required for repair of said local damage.

19. The appliance according to claim 18, wherein said bin forms a lower part of said second cylindrical borehole in said body;
    wherein a second stem is stalled in an upper part of said second cylindrical borehole in a vertically moving and swiveling way to form a glue supply valve;
    a head is connected to said stem of said glue supply valve arranged outside of said body;
    wherein said glue supply valve is fitted with a glue supply valve gasket and a groove for overflowing of said glue from said bin into said first channel in said body for supplying glue when said glue supply valve is in a lowered position.

20. The appliance according to claim 19, wherein said head of said glue supply valve is fitted with an arresting stop block for fitting against an arresting projection in said body in an upped position and an arresting safety pin engaging in a recess for said arresting safety pin in said body in a lowered position.

21. The appliance according to claim 19, wherein said second cylindrical borehole for said glue supply valve has a flat bottom.

22. The appliance according to claim 21, wherein said first channel in said body for glue supply has an entrance opening arrange at said bottom of said second cylindrical borehole for said glue supply valve.

23. The appliance according to claim 1, wherein an external circumference of said removable lid and an inner circumference of said body base are fitted with opposite circumferential semi-grooves, which together forming a distribution channel for underpressure distribution in said fixing compartment.

24. The appliance according to claim 1, wherein a lower part of said first cylindrical borehole is fitted with a first cylindrical seating of said first cylindrical borehole that engages a piston front seating of a piston front of said swiveling adjustable piston;
    wherein a first diameter (d) of said first piston front seating as well as a first diameter of said first cylindrical borehole in an area of said piston front seating are less than a second diameter (D) of an upper seating of swiveling adjustable piston as well as a second diameter of said first cylindrical borehole in an area of said upper seating; and
    at least one sealing ring installed at said piston front seating to seal a lowest working position of said first cylindrical borehole;
    a highest working position of said swiveling adjustable piston, said piston front seating with said first diameter (d) with said sealing ring of said piston front seating is arranged with free play in said first cylindrical borehole with said upper seating with said second diameter; and furthermore, said swiveling adjustable piston is equipped with a positioning head for controlling a valve device inside said body.

25. The appliance according to claim 24, wherein said positioning head is formed on said swiveling adjustable piston above said upper seating;
- a diameter ($D_H$) of said positioning head is larger than said second diameter (D) of said upper seating;
- said positioning head is equipped with a handle; and
- a difference in diameter ($D_H$) of said positioning head and said second diameter (D) of said upper seating provide an overlap with a recess for controlling said overflow valve by pressing or releasing said overflow valve in said third cylindrical borehole.

26. The appliance according to claim 25, wherein said body is equipped on an upper side with a cover with a cover borehole for said positioning head.

27. The appliance according to claim 26, wherein marks are formed on said cover providing information on a current working position of said swiveling adjustable piston.

* * * * *